Nov. 25, 1941.  F. W. WOHLFIELD  2,264,014
AUTOMOBILE REAR WINDOW SHIELD
Filed Jan. 10, 1941  2 Sheets-Sheet 1

Inventor
FREDERICK W. WOHLFIELD.
by Charles Miller Attys.

Nov. 25, 1941.  F. W. WOHLFIELD  2,264,014
AUTOMOBILE REAR WINDOW SHIELD
Filed Jan. 10, 1941  2 Sheets-Sheet 2
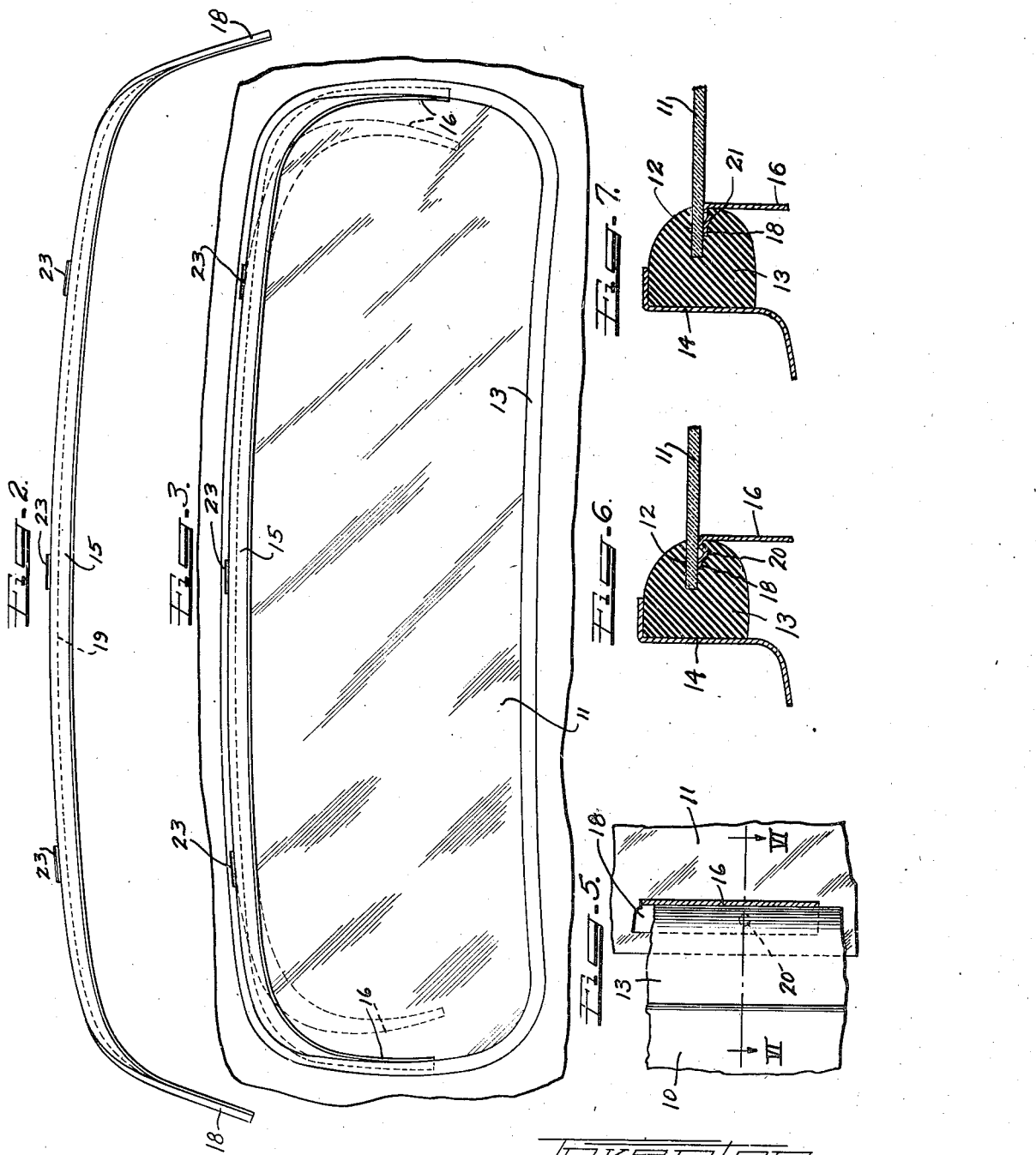
Inventor
FREDERICK W. WOHLFIELD.

Patented Nov. 25, 1941

2,264,014

UNITED STATES PATENT OFFICE 2,264,014

AUTOMOBILE REAR WINDOW SHIELD

Frederick W. Wohlfield, Detroit, Mich., assignor to Houdaille-Hershey Corporation, Detroit, Mich., a corporation of Michigan Application January 10, 1941, Serial No. 373,887

2 Claims. (Cl. 296—95)

This invention relates to automobile window shields and particularly to shields for the rear windows of cars having a sloping roof. During snow storms or heavy rains, these rear windows are quickly obscured so that it is impossible for the driver to see through them. The important object of the invention is therefore to provide a simple shield or visor which may be quickly and easily applied to the rear window of an automobile to function to prevent direct precipitation on the window but without obscuring full visibility range therethrough.

A further object of the invention is to provide a shield or visor for the purpose described which can be readily formed integral from light stock such as sheet metal and so shaped that it may be slipped at its edges into service position between the window pane and the rubber sealing strip now commonly used for securing and sealing the panes of rear windows.

A further object is to provide simple means for holding the shield or visor in service position against accidental displacement or unlawful removal thereof.

Another object is to provide simple means for breaking any vacuum which might tend to form within the shield during travel of the car so that snow or rain will not be drawn into the shield to obscure the visibility.

The various features of my invention are incorporated in the structure disclosed on the drawings, in which:

Figure 2 is a rear elevation of the shield before application thereof to a window;

Figure 3 is a rear elevation of the window showing the manner of springing and applying the shield into service position;

Figure 5 is an enlarged section on plane V—V of Figure 4;

Figure 6 is a section on plane VI—VI of Figure 5 showing one form of means for securing the shield against accidental displacement; and Figure 7 is a section like Figure 6 showing a modified holding means.

Figure 1:
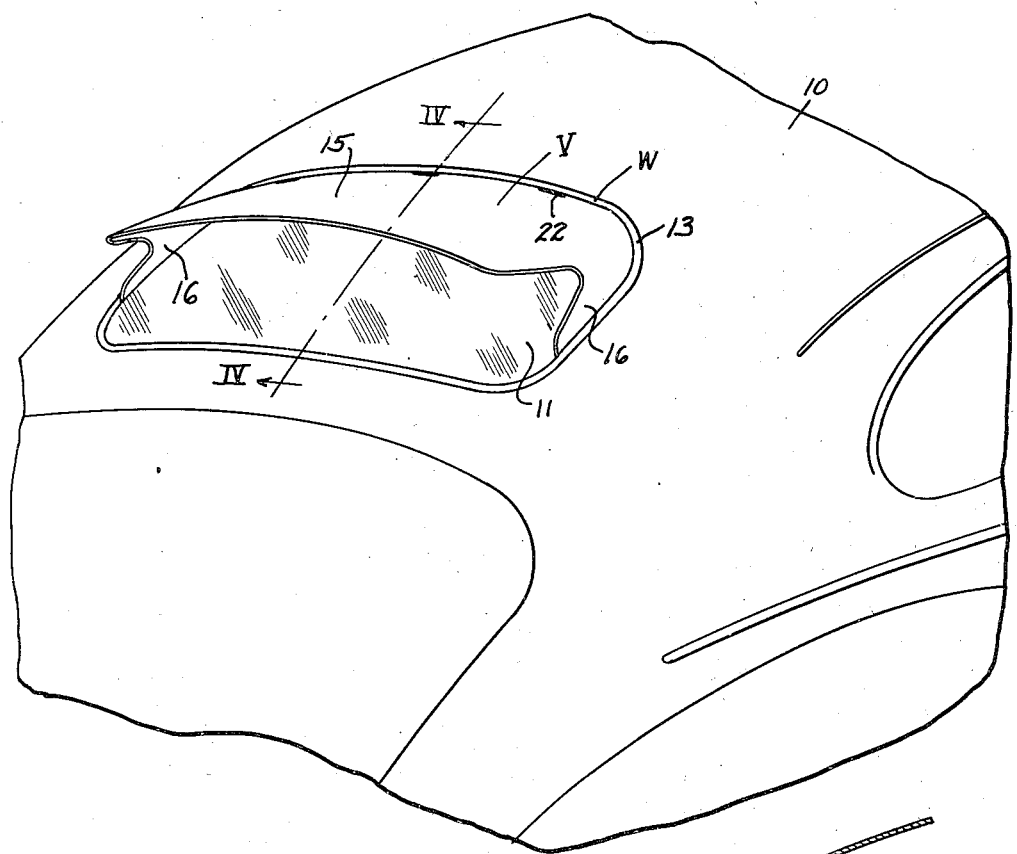
Figure 1 is perspective view of a portion of the rear end of a vehicle body showing my improved shield or visor applied to the rear window.
Figure 4:
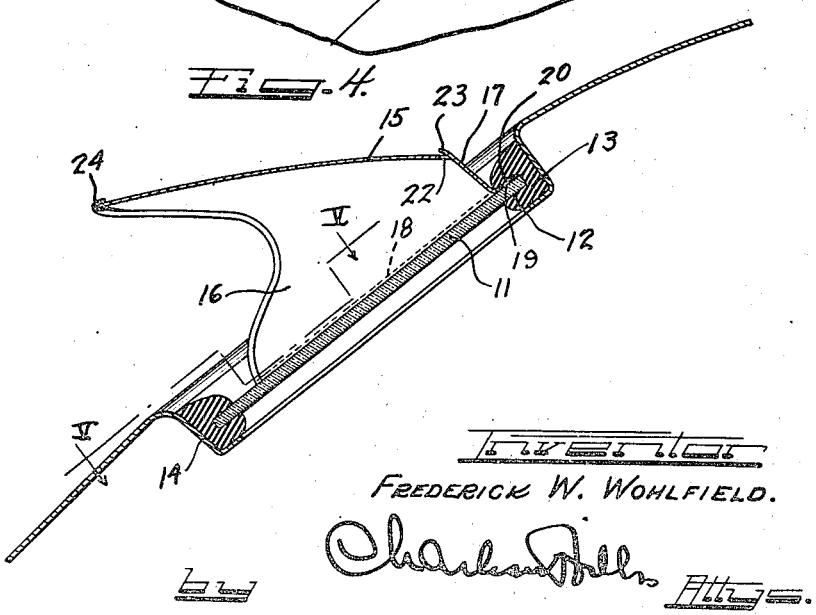
Figure 4 is an enlarged section on plane IV—IV of Figure 1.

Figure 1 shows a portion of the rear end of an automobile body 10 in which is the rear window W. As best shown on Figure 4, the window pane 11 is surrounded by and received at its edges in the recess 12 of a rubber sealing frame 13 which is snugly seated in a depression 14 in the vehicle top.

The shield or visor V comprises a top wall portion 15, side wall portions 16 and a front wall portion 17. The lower edge portions of the side walls 16 and the front wall 17 are deflected outwardly to form flanges 18 and 19 respectively for seating the shield against the window pane and for extending into recess 12 of the sealing strip or frame 13 so as to hold the shield in service position.

The shield may be formed integral of suitable material either metallic or non-metallic but is preferably formed integral from sheet metal such as steel. On the shield shown, the front wall 17 is substantially at right-angles with the window pane and it is of sufficient height so that the top 15 of the shield may have a slight downward inclination rearwardly but with its rear edge at or above the horizontal fore and aft line of the upper end of the window pane so that the shield will not interfere with full range of visibility through the pane, as clearly shown on Figure 4.

Figure 2 shows the shield after manufacture thereof and before application to the window, the side portions 16 being deflected a distance outwardly from the service positions they will assume. To apply the shield, the ends are bent inwardly a distance as indicated by the dotted lines on Figure 3 and the flange 19 on the front wall 17 is slipped into the recess 12 of the front leg of the sealing frame 13, and then the flanges 18 on the side wall portions 16 of the shield are slipped into the recess 12 along the side legs of the seal frame, the outward spring effort of the side walls 16 then tending to hold the shield in place with its flanges held against the face of the pane by the pressure and friction of the rubber seal 13.

Additional means may be provided for securely holding the shield in place. As shown on Figures 4 and 6, the shield flanges may be deflected to provide beads 20 which, after application of the shield to the window, will be surrounded by the rubber of the seal 13 and frictionally gripped to increase the frictional hold of the seal frame on the shield. The rounded beads shown will hold the shield in service position and against accidental displacement but will permit removal of a damaged shield.

In the arrangement shown on Figure 7, detent tongues 21 are extruded from the shield flanges with the tongues extending outwardly so that they will permit the shield flanges to be readily inserted into the seal frame recesses, but after insertion of the flanges, the rubber of the seal frame will move into detent engagement with the outer ends of the tongues and the shield will thus be more securely held against removal from the window and to frustrate attempts to unlawfully remove the shield.

When the shield is in service, its front wall 17 will function as a gutter to receive water or snow flowing down the vehicle top 10 and will direct it toward the sides of the window, while snow or rain striking the inclined top 15 will flow down beyond the window so that the window is protected against direct precipitation of rain or snow. In order to prevent the formation of eddy currents or vacuum within the shield during travel of the vehicle which might tend to draw rain or snow into the shield, vent openings 22 are provided. As best shown on Figure 4, such vent openings may be provided by extruding portions 23 from the top wall 15 adjacent to the front wall 17. The extruded portions 23 will then form upward continuations of the front wall 17 and shields for the vent openings 22 to prevent passage of snow or rain through these openings but to permit flow of air therethrough into the shield to prevent the formation of vacuum or eddy currents so that the window pane will be kept free of snow or rain for full and clear visibility therethrough.

Where the shield is of comparatively thin sheet metal, the rear edges of the top and side walls thereof may be sharp, and the edge portions may therefore be curled over, or, as shown, the edge portions may be received by a protective molding 24 of suitable metal, which molding will strengthen the edge portions and will also present an ornamental and finished appearance.

I thus produce a simple, economically manufactured and efficient shield or visor which can be readily and quickly slipped into service position on a window and which will function to prevent precipitation of rain or snow on the window pane and keep it at all times clear for full range of visibility therethrough by the driver of the vehicle.

I have shown a practical embodiment of my invention but I do not desire to be limited to the exact construction and arrangement shown and described as changes and modifications may be made without departing from the scope of the invention.

I claim as follows:

1. A shield for the rear window in the sloping top of an automobile comprising a front wall and side walls and a top wall supported by said front and side walls above the window to prevent direct precipitation of rain or snow on the window, said front and side walls being adapted at their edges to be secured against the window pane along the top and sides thereof, said top wall adjacent to said front wall having a small number of vent passageways of just sufficient size to permit inflow of air to prevent the formation of eddy currents or vacuum within the shield when the vehicle is traveling, said top wall except for said vent passageways being continuous and unbroken.

2. A shield or visor for the rubber-sashed rear window pane in the sloping top of an automobile, comprising a continuous unbroken top wall for extending entirely over the window pane and a front wall and side walls for supporting said top wall, flanges formed in the edges of said front and side walls for insertion between the window pane and the rubber sash along the top and sides thereof for frictionally holding the shield in service position, a comparatively small number of vent holes in said top wall at the junction thereof with said front wall, said vent holes being of just sufficient area for the inflow of air to prevent the formation of eddy currents or vacuum within the shield when the vehicle is traveling, and portions of said front wall overhanging said vent holes for preventing the precipitation of rain or snow therethrough.

FREDERICK W. WOHLFIELD.